Figure 1:
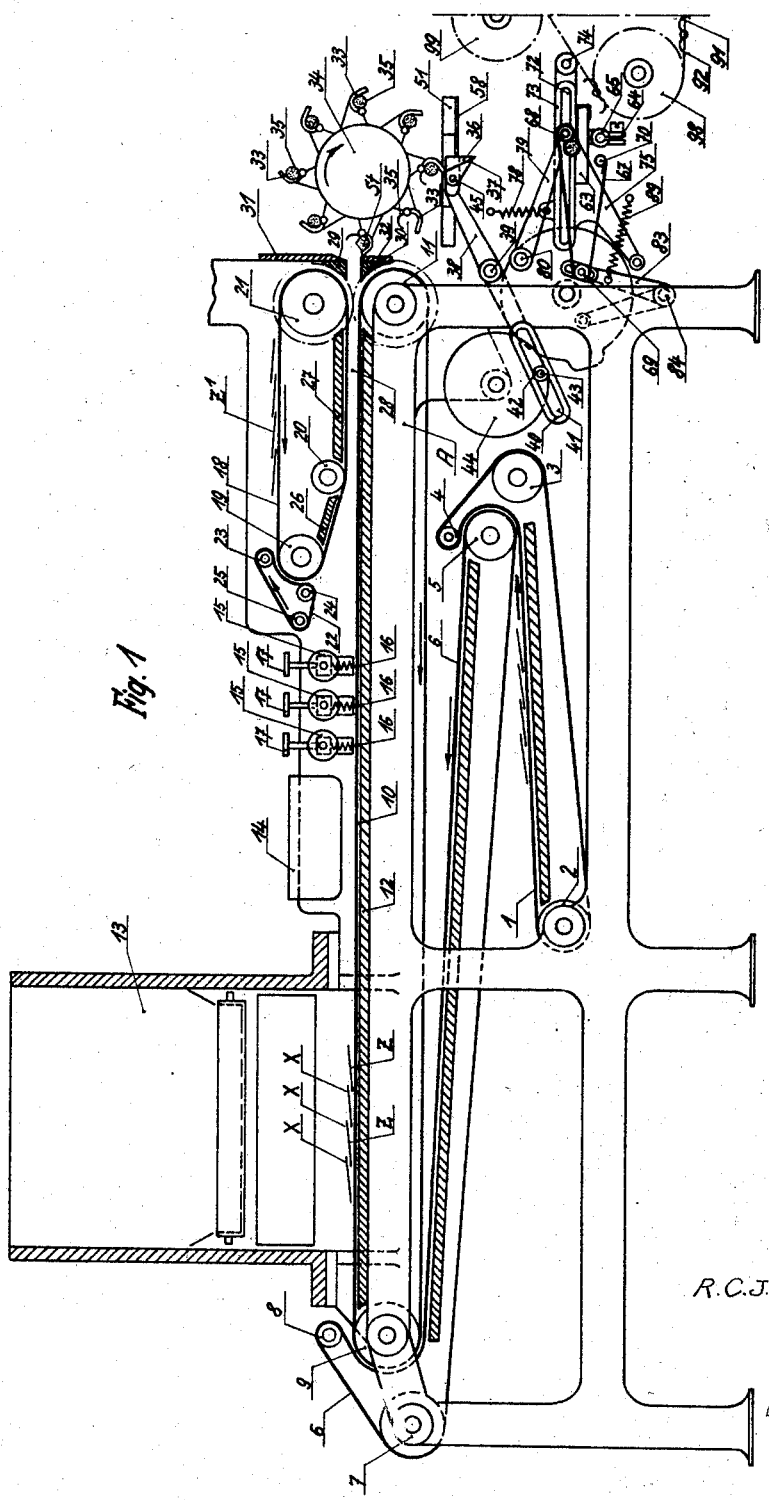

Nov. 25, 1930.    R. C. J. A. OHMSEN    1,782,627
CIGAR MAKING MACHINE
Filed Oct. 17, 1927    9 Sheets—Sheet 1

R.C.J.A. Ohmsen
INVENTOR

By: Marks & Clerk
Attys.

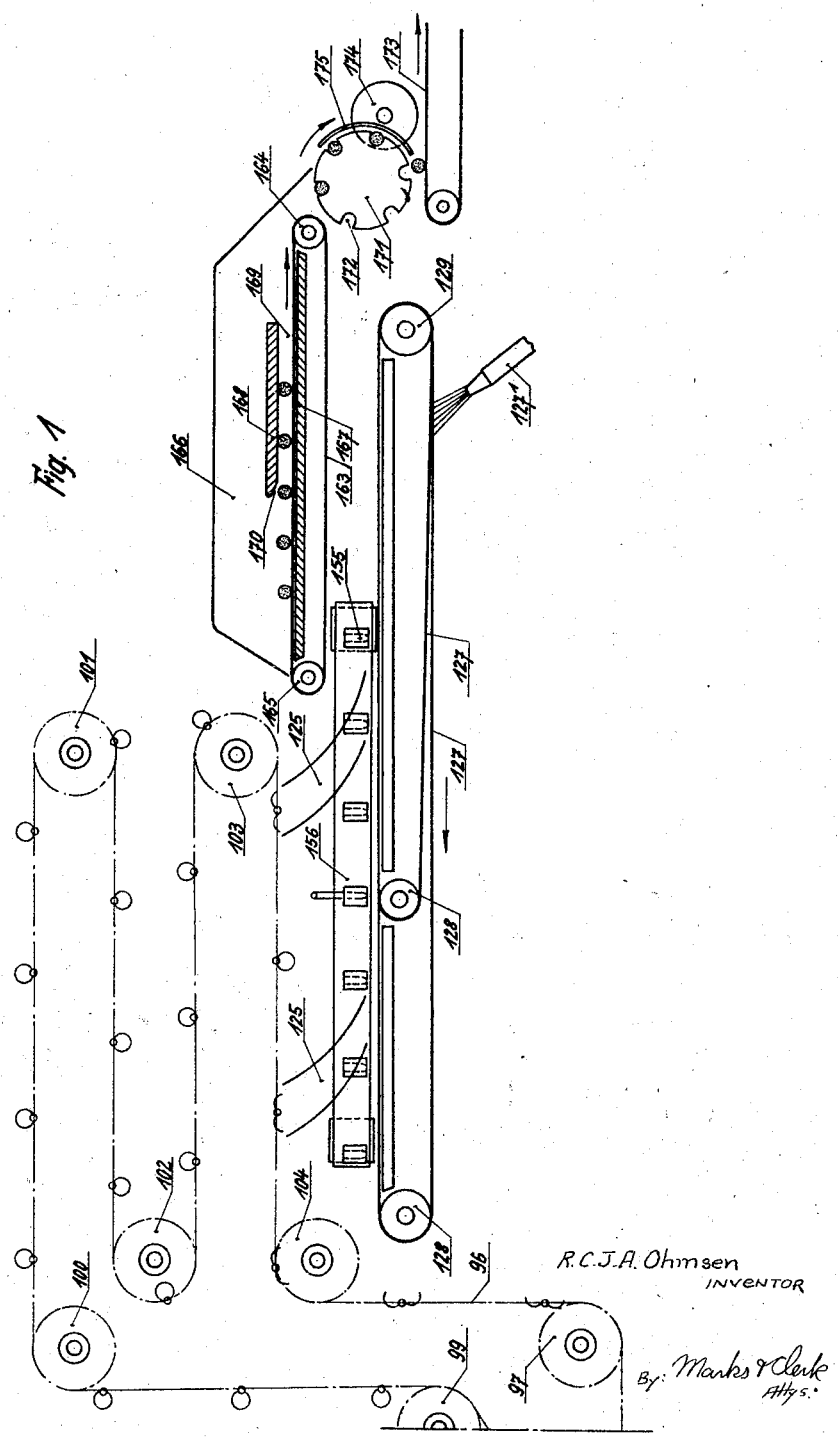

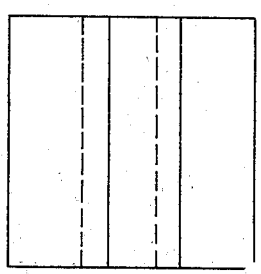
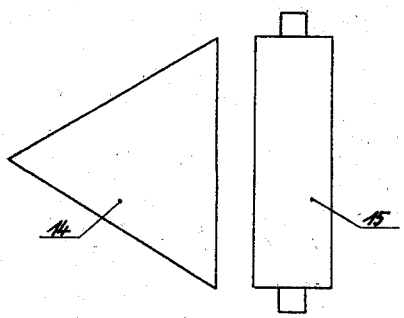
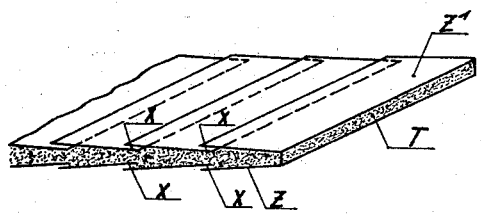
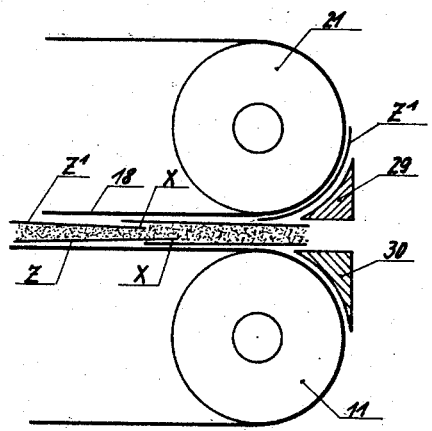
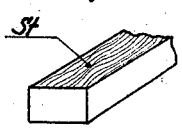

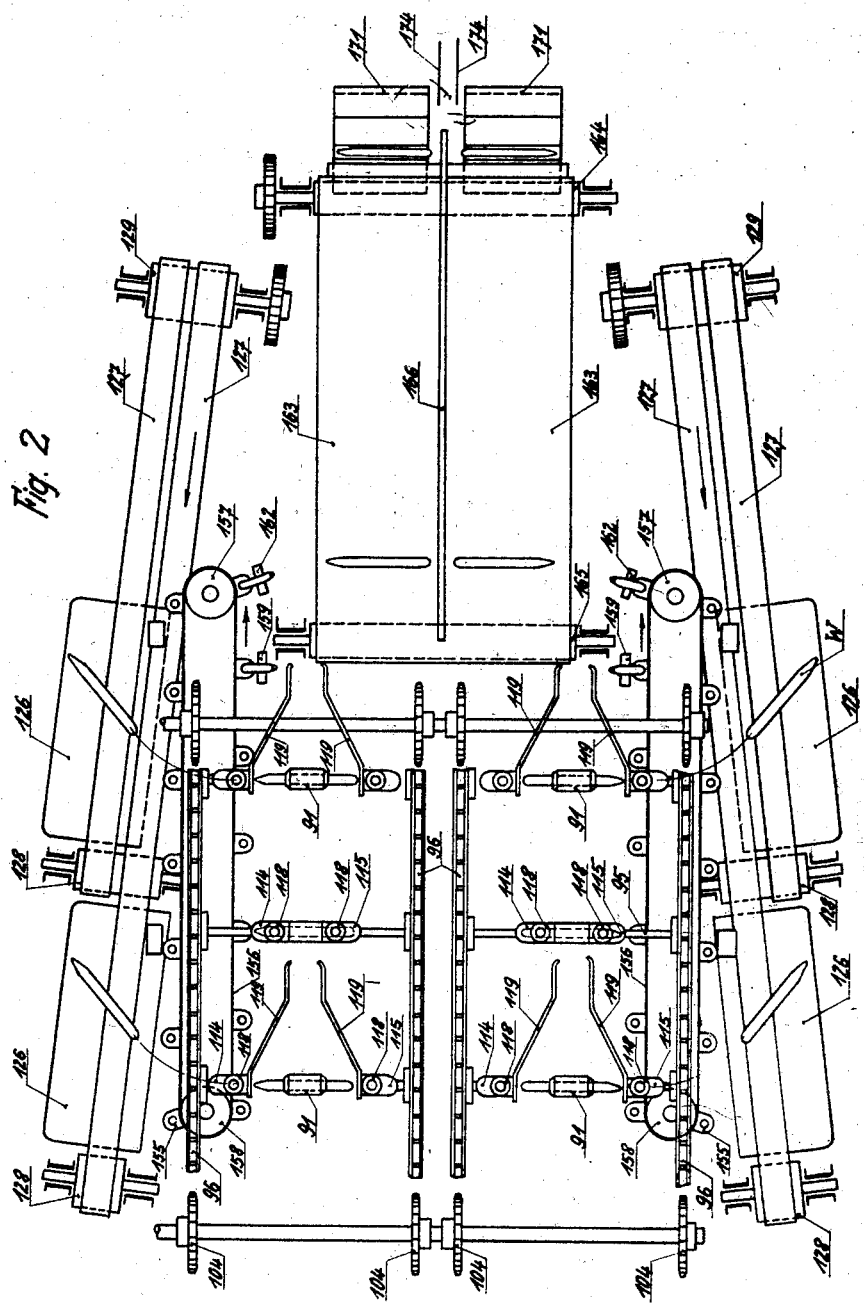

Nov. 25, 1930.  R. C. J. A. OHMSEN  1,782,627
CIGAR MAKING MACHINE
Filed Oct. 17, 1927   9 Sheets-Sheet 5
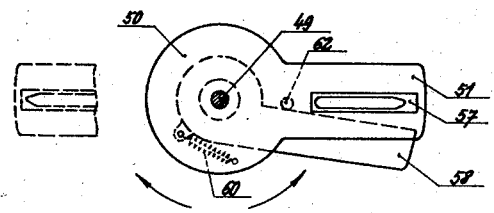
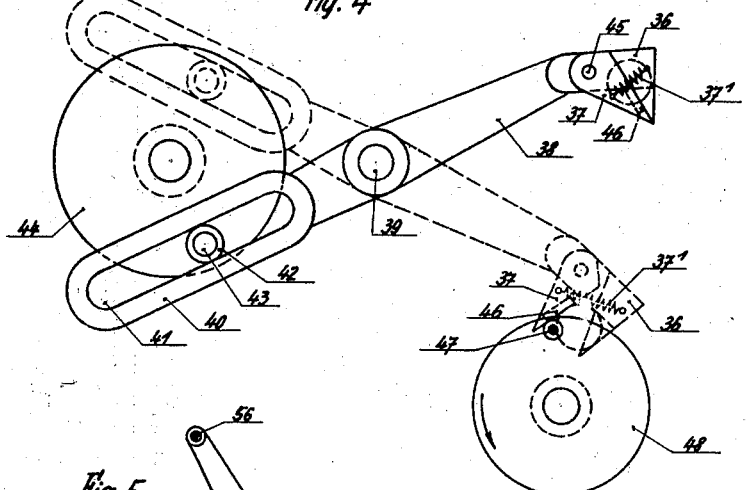
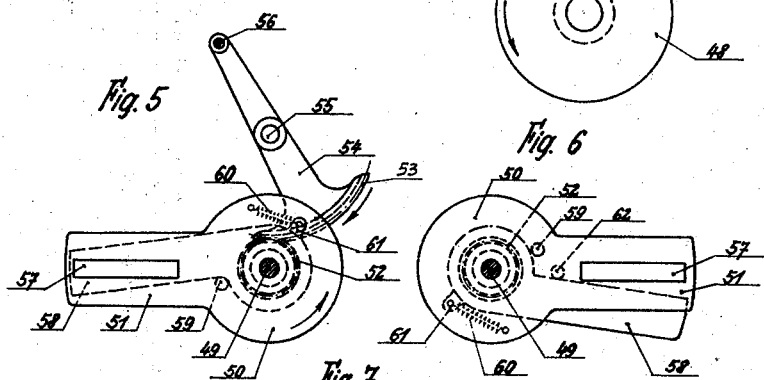
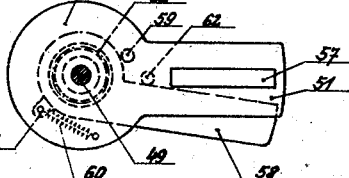
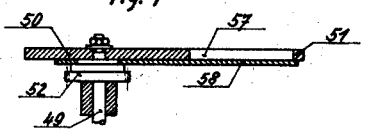
R. C. J. A. Ohmsen
INVENTOR
By: Marks & Clerk
Attys Nov. 25, 1930.   R. C. J. A. OHMSEN   1,782,627
CIGAR MAKING MACHINE
Filed Oct. 17, 1927   9 Sheets-Sheet 6

R. C. J. A. Ohmsen
INVENTOR
By Marks & Clerk
Attys.

Nov. 25, 1930.  R. C. J. A. OHMSEN  1,782,627
CIGAR MAKING MACHINE
Filed Oct. 17, 1927   9 Sheets-Sheet 7

R. C. J. A. Ohmsen
Inventor

By: Marks & Clerk
Attys.

Nov. 25, 1930.  R. C. J. A. OHMSEN  1,782,627
CIGAR MAKING MACHINE
Filed Oct. 17, 1927  9 Sheets-Sheet 9
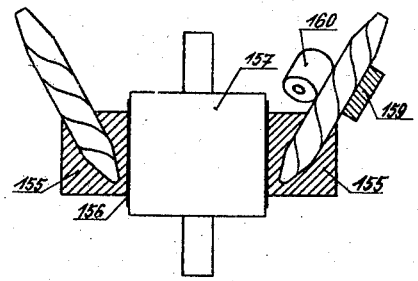
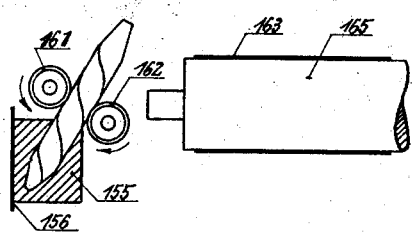
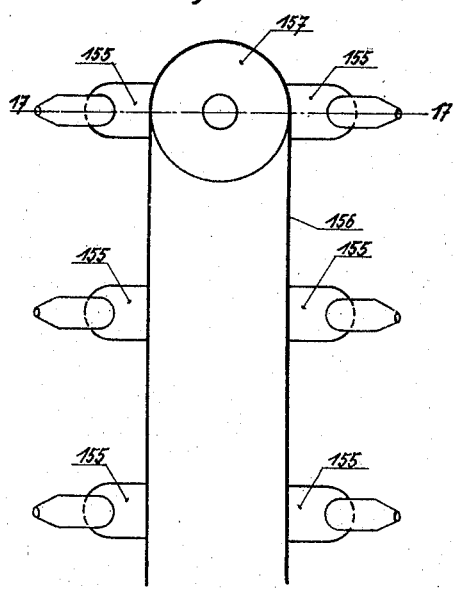
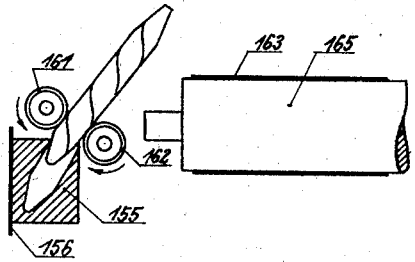
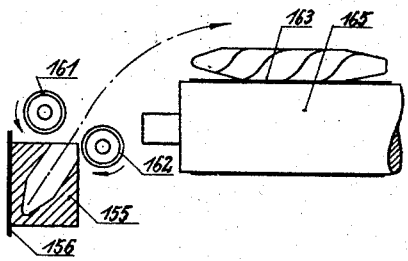

Patented Nov. 25, 1930

1,782,627

UNITED STATES PATENT OFFICE

RICHARD CARL JULIUS ADOLF OHMSEN, OF DRESDEN, GERMANY, ASSIGNOR TO FIRM JOHANN CARL MULLER, OF DRESDEN, GERMANY

CIGAR-MAKING MACHINE

Application filed October 17, 1927, Serial No. 226,754, and in Germany October 20, 1926.

The manufacture of cigars by mechanical means, as hitherto practised, has always been carried out in this way, that a definite quantity of tobacco was separated off by weighing or the like, and so formed into a filler which was thereupon made into the finished cigar in a rolling machine or the like.

In contradistinction thereto the new method consists in this, that on a foundation formed of cut tobacco leaves the tobacco for the filler is placed in a layer corresponding to the thickness and shape of the cigar and is then covered by a cover formed of tobacco leaves which have been cut to shape. In this way a continuous band-like member is formed, from which transverse strips are cut off, which have the length of one or more cigars. The separated pieces are thereupon passed to a mechanical rolling device, which may be of a known construction, and are formed into a filler in the same, which is passed to a travelling mould, from which it is delivered, after the necessary period for giving it its shape, to the place where the preliminarily formed fillers are provided by the cigar-maker with the wrapper leaves fed to the working place by endless bands or the like.

In this method, a continuous band-like strip of tobacco is used, so that the only manual operation to be carried out by the worker is the wrapping round of the wrapping leaf, while all the other operations take place mechanically.

In carrying out this method, it is possible to allow for the fact that, according to the known nature of the wrapper leaves, the cigars must be rolled first from the right and then from the left, the separated-off portions of the strip being alternately fed to either of two rolling devices which deliver the fillers to two groups of moulds, which are supported by common conveying means, and are so positioned that the moulded fillers delivered to each group pass with their points facing away from one another to two operating points for the cigar maker.

Figure 8:
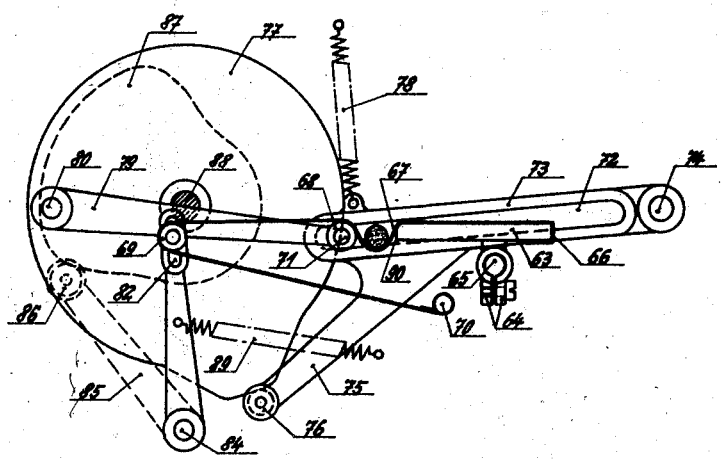
Figure 9:
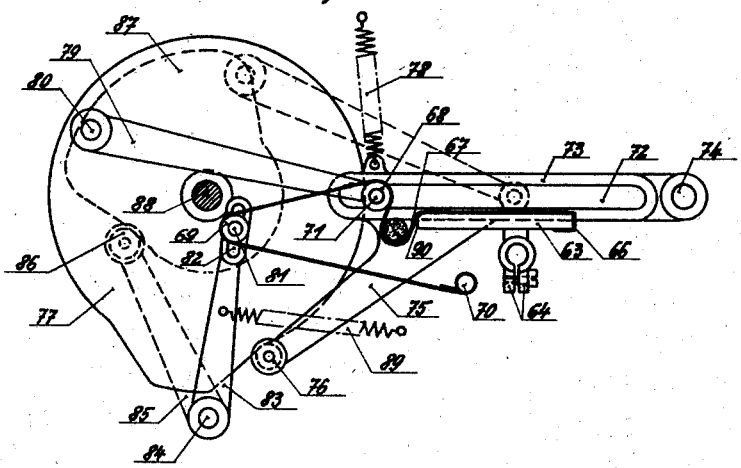
Figure 10:
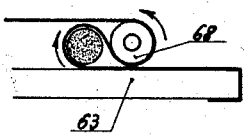
Figure 11:
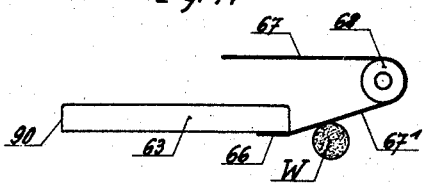
Figure 12:
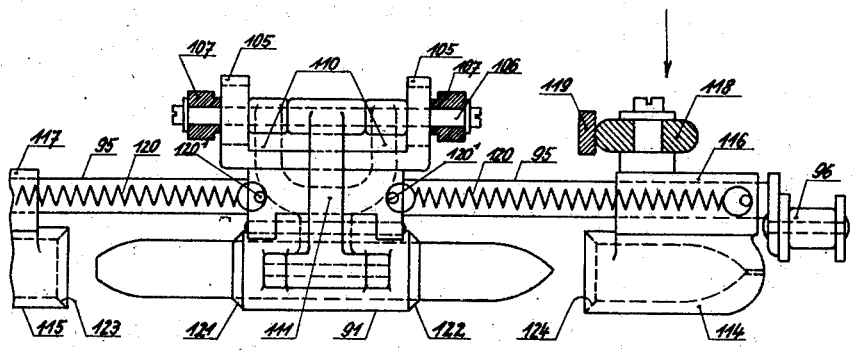
Figure 13:
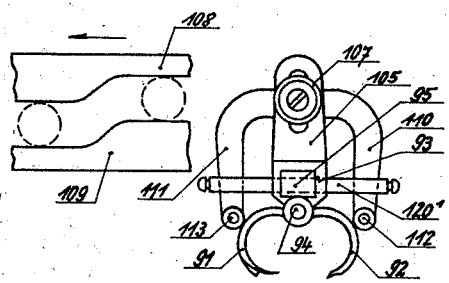
Figure 14:
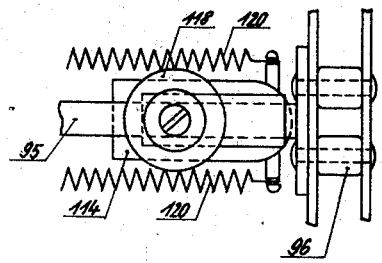
Figure 15:
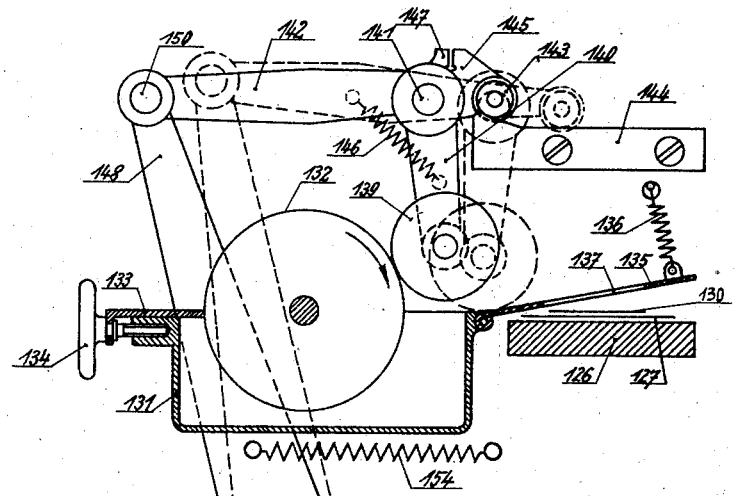
Figure 16:
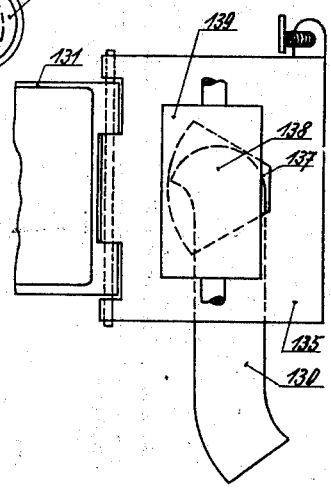

In the accompanying drawing which illustrates a suitable machine for carrying out the method according to the invention:

Fig. 1 shows the machine in side elevation, partly in longitudinal section,

Fig. 1ª is a plan view showing cut pieces of tobacco arranged in overlapping relation, Fig. 1ᵇ is a plan detail of the distributor, Fig. 1ᶜ is a perspective detail of a band-like member formed of tobacco and leaves, Fig. 1ᵈ is an enlarged longitudinal section of the guiding means for the band-like tobacco member, Fig. 1ᵉ is a perspective detail of a strip separated from the band-like tobacco member for the purpose of forming a single filler, Fig. 2 is a plan view of the right hand part of the machine shown in Fig. 1, Fig. 3 is a detail view of the reversing member, Fig. 4 is a side elevation showing the means for controlling the conveying trough which conveys the filler to the rolling device, Figs. 5–7 show details of the reversing member which causes the transverse strips separated from the continuous band to be conveyed to one or the other rolling device, Figs. 8 and 9 show the rolling device in side elevation in two different positions, Figs. 10 and 11 are details of Figs. 8 and 9, Fig. 12 shows the three-part mould open, Fig. 13 shows the middle part of the mould with the controlling means in the open state, Fig. 14 is a detail view of the right-hand part of the mould viewed in the direction of the arrow shown in Fig. 12, Fig. 15 shows the means for applying the adhesive in side elevation, partly in cross-section, Fig. 16 is a plan view of the main part of the adhesive applying means, Fig. 17 shows the socket supporting arrangement for the cigars coming from the roller, in vertical cross-section on line 17—17 of Fig. 18, Fig. 18 is a plan view of the socket supporting device, and Figs. 19–21 show different positions of the means for removing the cigar from the socket carrier.

From suitably prepared tobacco leaves cuttings are made, of rectangular shape and the length of a cigar. These cuttings are laid on the upper stretch of an endless band 1, which is guided over the guide rollers 2—5, and travels in the direction of the arrow. In laying on the cut pieces of tobacco Z, the separate pieces are placed so as to cover each other in the manner of scales, with their longitudinal edges over-lapping, as shown more particularly in Fig. 1ª.

Over the roller 5 the second endless band 6 is guided, which also runs over the guiding rollers 7—9. The endless band 6 with its upper stretch removes the cut pieces Z from the endless band 1 and passes them to a further endless band 10 which is guided over the roller 9 and the roller 11 and travels in the direction of the arrow. The upper stretch of this band, on which the cut pieces of tobacco rest, travels over the surface of the table 12. On this band the cut pieces of tobacco lie with their edges over-lapping in such a manner that the ends x of the separate cut pieces Z, which lead in the direction of travel of the band (cf. Fig. 1), are covered towards the outside by the cut pieces of tobacco preceding them.

On to the layer of tobacco leaf thus prepared, a uniform layer of tobacco is laid by the spreader 13 (cf. Fig. 1), which layer has about the thickness of a cigar. The tobacco spreader may be of any known construction. In order to obtain as uniform a distribution as possible of the layer of tobacco on the support, a distributor 14 similar to a snow plough is located in the path of the endless band 10, of which distributor Fig. 1ᵇ shows a plan view. The distributor equalizes any inequalities in the thickness in the layer of tobacco, its lower edge being arranged at a suitable distance above the upper stretch of the endless band 10 and the inclined lateral surface distributing any excess of tobacco by pushing it aside.

Behind the distributor 14 several pressing and equalizing rollers 15 are provided, the shafts of which are journalled in side walls of the machine frame A so as to be adjustable vertically in sliding blocks, springs 16 seeking to keep the sliding bearings of the roller shafts always pressed upwards and the height of the bearings being adjusted by means of adjusting screws 17. The rollers are rotated by suitable driving means, compress the layer of tobacco resting on the endless band 10, in such a manner that it will be of uniform thickness throughout.

Behind the rollers 15 a covering layer of cut pieces of tobacco leaf is placed on the top. The cut pieces of tobacco Z' intended for this purpose are laid on the upper stretch of an endless band 18 which is guided over the rollers 19, 20 and 21 and travels in the direction of the arrow. In this case as well, the pieces are laid on one another in such a manner that they overlap one another with their longitudinal edges in the manner shown in Fig. 1ª. Over the roller 19 a further endless band 22 is guided by means of the guiding rollers 23—25. The cut pieces of tobacco Z' passing between the stretches of the endless bands 18 and 22 are laid on the layer of tobacco, also in such a manner that the ends of the separate cut pieces of tobacco, which lead in the direction of motion of the band-like layer of tobacco, are covered at the outside by the preceding cut pieces of tobacco. By this means a band-like member is formed as shown in perspective in Fig. 1ᶜ. The tobacco T is contained between two layers of tobacco leaf, each formed by the cut pieces Z and Z', the separate cut pieces overlapping one another in such a manner that all the leading edges x of the separate cut pieces are covered at the outside by the preceding cut pieces of tobacco leaf.

The lower stretch of the endless band 18 is guided over the guiding surfaces 26 and 27, of which the former, 26, is inclined, while the other, 27, is parallel to the table 12. Thus the two bands 18 and 10 form a channel, into which the band-like member illustrated in Fig. 1ᶜ passes, being at the same time compressed, the inclined guide 26 forming a tapering inlet opening for the channel, which facilitates the entrance of the band-shaped layer and at the same time allows it to be compressed. The band-like layer thus guided through the channel 28 passes behind the opposed guide rollers 11 and 21 between the cheeks 29 and 30 to a separating device. In case the cut pieces of tobacco Z and Z' covering the band-like layer above and below should, in being guided along by the endless bands 10 and 18, get into the gap between the guide rollers 11 and 21 and the cheeks 30 and 29 respectively, the scale-like overlapping of the pieces prevents more than the first cut piece being carried through, while the leading edge of the next cut piece, since it is directed inwardly, will not be drawn into the gap, as illustrated to an enlarged scale in Fig. 1ᵈ.

From the band-like strip of tobacco the top cutter 31 co-acting with the bottom cutter 32 separates a transverse strip, which contains the requisite quantity of tobacco for forming one cigar filler and also has a prepared shape. Such a separated strip is shown in perspective in Fig. 1ᵉ and bears the reference Sᵗ.

For the piece Sᵗ which has been separated from the band a receiving trough 33 is provided which, as shown in Fig. 1, is in a position ready to receive it. A plurality of receiving troughs are arranged around the periphery of a drum 34. Each trough is provided with a cover 35 which is hinged to the trough and is controlled in such a manner that it closes down on the trough at the suitable moment, thus forming a closed container of circular cross-section. The closing and opening of the cover 35 is effected by known means, which for the sake of clearness, are not shown in the drawing, in such a manner that, after a piece S$^t$ has been introduced into the opened receiving through 33, the cover 35 is moved into the closed position during the continued rotation of the drum 34, the piece S$^t$ which was previously rectangular in cross-section being pressed so as to give it a circular cross-section. During the continued rotation of the drum 34 the cover of the mould remains closed until the mould in question reaches the point where the preliminarily moulded filler is to be delivered. It should be noted, that the cut tobacco of the filler is now completely surrounded by the cut leaves Z and Z' the latter thus forming a protecting envelope for preventing the delicate wrapper being damaged by sharp projecting bits in the cut filling tobacco.

The opening of the mould by the cover 35 being hinged over takes place at the lowest point of the drum 34 which rotates in the direction of the arrow shown in Fig. 1. The preliminarily moulded filler can then slide down out of the trough 33. Means may be provided in a known manner for ejecting the filler out of the trough, if it should not fall out. The filler falls into a conveying trough consisting of the two parts 36 and 37, (see Fig. 4). This conveying trough is mounted at the end of a rocking lever 38, which rocks about the pin 39 in the frame, and beyond the said pin has an extension 40 having a longitudinal slot 41. In the longitudinal slot there engages a crank pin 43 provided with a roller 42, and mounted in the crank disc 44. On the crank disc rotating the rocking lever 38 is caused to rock, finally moving into the position indicated by broken lines in Fig. 4.

The part 36 of the conveyor trough is fixed rigidly to the rocking lever 38, while the part 37 is mounted so as to be capable of turning about the pin 45, on the lever 38 being held by a spring 37' against the part 36. When closed, the parts 36 and 37 form a pocket of triangular cross-section and open at the top, the vertex of the triangle pointing downwards. The pocket is given this form (as will be more particularly described below) in order that, on the lever 38 swinging downwards, the vertex of the triangle shall strike against the horizontal rolling cloth and form a loop in the same, into which the filler, resting in the pocket, is placed. This is effected by the pocket being opened after the loop has been formed. For opening the pocket a stop 46 is provided on the end wall of the spring loaded part 37, with which stop, at the suitable moment, a roller 47 enters into engagement, which is mounted on the side of a rotary disc 48 close to the edge of the same. At each rotation of the disc the roller 47 will move once into the position shown in Fig. 4, in which it strikes against the stop 46 and thereby rocks the rocking part 37, in opposition to the tension of the spring 37', into the open position. In this manner the conveying trough is opened at the bottom so that the filler contained therein can enter the loop in the rolling cloth.

In the constructional example shown, two rolling arrangements are provided, lying next to one another, for enabling one filler to be rolled to the left and another to the right, and two corresponding levers 38 are provided next to one another, each with a conveying trough 36, 37. The drum 34, with the preliminary moulds 33, 35, is, however, within range of only one of the conveying troughs, for which reason it is necessary that each second preliminarily moulded filler shall be conveyed to the adjacent conveying trough. While this is taking place, the first conveying trough conveys the filler to the corresponding rolling device.

For conveying each alternate filler to the second conveying trough, the arrangement shown in Fig. 3 and more particularly in Figs. 5–7 is provided. Below the drum 34, a disc 50 with an extension 51 is mounted on a vertical shaft 49. On the vertical shaft below the disc 50 a spur wheel 52 is fixed which meshes with a toothed sector 53 mounted on a rocking lever 54. The rocking lever is mounted so as to turn on the pin 55 in the frame and carries on an extension beyond the said pin a roller 56 with which it engages in the cam groove of a cam disc, not shown in the drawing. The cam groove controls the rocking lever 54 in such a manner that the toothed sector 53 performs a to and fro motion which is transmitted by means of the spur wheel 52 to the shaft 49. By this means the disc 50 with the extension 51 is also turned to and fro, the proportions being made such that it performs a revolution of 180°.

The extension 51 has a slot 57, the size of which is such that it forms a pocket into which a filler delivered by the preliminary moulds 33, 35 fits. After a filler has been delivered to the conveying trough 36, 37 which is within range of the drum 34 and the said conveying trough has moved downwards, the extension 51 with its pocket 57 moves into the place vacated by the conveying trough so that the next filler is delivered to the pocket 57. As soon as this has taken place, the disc 50 with the extension 51 turns through 180° for delivering the filler in it to the second conveying trough 36, 37, which is located next to the first conveying trough at a suitable distance therefrom. The bottom of the pocket 57 is formed by a sliding member 58. This member is arranged to turn freely about the shaft 49, so as to rest against the bottom of the extension 51. On the disc 50 is a stop 59 against which the sliding member is drawn by a spring 60, one end of which is attached to a lug 61 on the sliding member, and the other end to the disc 50. The spring 60 causes the sliding member 58 to be drawn into the position shown in Fig. 5 in which it forms the bottom of the pocket 57. On the extension 51 being turned through 180° the sliding member strikes against a stop 62 on the frame shortly before the extension 51 has completed its rotation through 180°. By this stop the sliding member is held back so that it cannot take part in the whole of the turning motion (cf. position shown in Fig. 6). Through the sliding member being held back, the bottom of the pocket 57 is withdrawn so that the filler can fall downwards out of it. On falling down the filler passes into the second conveying trough 36, 37 and is conveyed by the said conveyor to the second rolling device, through the lever 38 which carries the second conveying trough rocking downwards. This takes place during the continued rotation of the drum 34 and during the return rocking motion of the rocking lever 38 of the first conveying trough.

The two rolling devices, which are constructed in the same manner and lie next to one another, are shown separately to an enlarged scale in Figs. 8 and 9. A stationary rolling table 63 is provided, which is fixed by means of a clamp 64 to a bar 65 attached to the frame. At the end 66 of this rolling table one end of the rolling cloth 67 is fixed. The rolling cloth rests on the table 63 and passes over the rolling roller 68 and thence over a guide roller 69 to the bottom 70 of the frame to which the other end of the rolling cloth is fixed. The journals 71 of the rolling roller 68 are guided in a straight line in lateral slotted guides 72. These slotted guides are in levers 73 which are capable of rocking about the bar 74 in the frame. The levers are provided with extensions 75 in which rollers 76 are journaled, which engages with a cam disc 77. Through springs 78 attached to the levers this engagement is ensured. With the ends of the rolling roller shaft 71, which project laterally through the slotted guides, connecting rods 79 are in engagement, the other ends of which are mounted on crank pins 80 which are mounted on crank discs 77. The guiding roller 69, over which the rolling cloth 67 runs, is supported on a shaft 81 the ends of which rest in longitudinal slots 82 of supporting levers 83, so as to be capable of sliding and being fixed therein. The levers 83 are fixed on shafts 84. On these shafts are also fixed levers 85, the unsupported ends of which carry rollers 86 which rest against the cam discs 87. These cam discs are fixed on the shaft 88 of the cam discs 77 already referred to. The rollers 86 are kept in contact with the cam discs 87 by springs 89, having one end fixed to the frame of the machine and the other end to the levers 83.

The rolling devise operates in the following manner:

At the commencement of the rolling operation all the parts are approximately in the positions shown in Fig. 8, but the rolling cloth 67 is still tightly stretched between the end 90 of the table 63 and the rolling roller 68. On the lever 38 rocking downwards, the conveying trough 36, 37 arrives at the rolling device, and the apex of the triangular conveying trough strikes the stretched rolling cloth between the end 90 of the table 63 and the rolling roller 68. During its continued downward motion the conveyor trough presses the rolling cloth downwards and thus forms a loop between the end 90 of the table and the rolling roller 68. The lever 83 by rocking to a suitable extent to the right in Fig. 8 provides sufficient slack for forming the loop. When the loop is formed, the conveying trough 36, 37 opens and delivers the filler to the loop, as shown in Fig. 8. On the lever 83 continuing to rock to the right, the slotted guide 72 is raised, raising the rolling roller 68 to the level of the top of the table 63, whereupon the connecting rod 79 moves the rolling roller in the slotted guide 72 to the right so that it runs along the surface of the table 63, the filler being carried along and formed in the manner shown in Fig. 10. Finally the rolling roller reaches the position shown in Fig. 11, in which the part 67' of the rolling cloth 67 becomes taut, and the filler W can fall down freely. When this has taken place all the parts return into the initial position shown in Fig. 8.

The wrapper is laid on the rolling table in the usual manner, such that the end of the wrapper projects beyond the end 90 of the table as far as the rolling roller 68, and is pressed by the conveying trough 36, 37 down into the loop.

The finished fillers W ejected by the rolling device are passed on to a mould shown to an enlarged scale in Figs. 12–14. This mould consists of three parts, the middle part of which first receives the delivered filler. This middle part of the mould consists of two trough-shaped members 91 and 92 which are connected together by a hinge. These troughs arrive in the open state, as shown in Fig. 13, but in the reverse position, that is open at the top, so that the filler falls into the open trough. The trough carrier 93 with its hinge 94 is mounted on a bar 95 of rectangular cross-section. The ends of this bar are fixed, as shown in Figs. 2 and 14, to two parallel chains 96. These chains are endless and very long, and are guided in the manner shown in Fig. 1 over the sprocket wheels 97—104.

The carriers 93 of the trough members 91, 92, which are fixed in the middle of the bars 95, are provided with an extension 105. In longitudinal slots in the limbs of the U-shaped extension 105, a transverse shaft 106 is slidably guided, on the two ends of which, extending beyond the limbs, guide rollers 107 are arranged, which are capable of engaging with guiding rails 108, 109 (cf. Fig. 13). These guiding rails form between them a cam slot which is so shaped that it causes the shaft 106 to be displaced, at the suitable moment, for opening or closing the trough members 91, 92. For this purpose between the limbs of the part 105 scissor-arms 110 and 111 are arranged so as to rock on the shaft 106, the unsupported ends of the said arms being pivoted at 112 and 113 to the trough-shaped members 91 and 92.

As soon as the filler has fallen from the rolling device into the opened trough-shaped members 91, 92, the guiding slot between the rollers 108 and 109 produces a displacement of the shaft 106 towards the pivot pin 94, thereby closing the members 91, 92. By this means the middle part of the filler is gripped in the manner shown in Fig. 12 by the part of the mould formed by the members 91, 92.

The two other parts of the mould have the form of caps which are slid on to the projecting ends of the filler. These two caps bear the numerals 114 and 115. Extensions 116 and 117 on the said caps embrace the bar 95 so as to slide thereon. On the bars 116 and 117 rollers 118 are mounted which are capable of engaging with curved guide rails 119 (see Fig. 2). Two springs 120 are provided, each having one end attached to one of the members 116 and 117 and the other end to a pin 120', the two pins 120' being supported by the carrier 93 of the middle part of the mould. The springs 120 seek to pull the cap-shaped parts 114, 115 towards the middle part 91, 92 of the mould. As soon as the rollers 118 come into contact with the guide rail 119, the cap-shaped parts are pushed outwards on the bar 95, tensioning the springs 120, so that the parts 114, 115 will occupy the positions shown in Fig. 12. The cap-shaped parts are in this position when the trough-shaped members 91, 92 receive the filler. When this has taken place, the rollers 118 leave the guide rails 119 so that the cap-shaped parts 114, 115 can follow the tension of the springs 120 and slide on to the ends of the filler projecting from the middle part of the mould. The mould is closed in this way, the cap-shaped parts 114, 115 coming right up against the middle part of the mould, the ends of which are coned at 121, 122, while the bores of the cap-shaped parts are provided with corresponding cones 123, 124.

The guide rails 119 for controlling the cap-shaped parts of the mould, and the guide rails 108 and 109 for controlling the gripper troughs of the middle part of the mould, are, in the constructional form shown in Figs. 1 and 2, mounted within range of the places where the moulds are opened again for conveying the moulded filler to where it is provided with the wrapper. The rails may be extended up to the point where the open moulds arrive for receiving a further filler, so that the moulds remain open from the point where they have delivered the finished filler to the working places of the persons who roll the wrappers around the fillers, to the point where they receive a fresh filler from the rolling device. The rails 119 and the rails 108 and 109 may, however, also be placed at the points where the moulds are to be opened for receiving a fresh filler and consequently at the point where the closed moulds are to be opened again, for discharging the finished filler. (See Fig. 2.)

The moulds, after having received the fresh filler and having been closed, are led by means of the chain 96 along a long path over guide rollers 99—100 so that the fillers in the moulds have time to adapt themselves properly to the mould, and will consequently, after the mould has been opened, retain the shape given them.

The opening of the moulds takes place at the points shown in Figs. 1 and 2, the moulds being turned downwards in the manner shown in Figs. 12 and 13, so that, on the parts 91 and 92 being opened, the finished filler can fall down under gravity. Guiding channels 125 (see Fig. 1) are provided which serve as guide-ways and guide the filler, which has fallen into them, to the side, that is to the working tables 126 of the persons who roll the wrappers around the fillers. As will be seen from Fig. 2, the guiding channels 125 are so arranged that they convey the fillers to the working tables 126 in a definitely inclined position. This inclination is such that the fillers will lie in the position ready for wrapping, so that the person who has to apply the wrapper can immediately commence to wrap it on, assuming that the wrapper is also delivered in the correct position. The conveyance of the wrappers is effected by means of an endless band 127 which is guided over the guide rollers 128, 129 and travels in the direction of the arrow. The wrappers fed to the endless bands 127 lie on the said bands in such a position that the longitudinal direction of the wrapper corresponds with the longitudinal direction of the endless bands, the latter being positioned at an inclination to the persons who apply the wrappers and to the deposited fillers, such that the wrappers reach the fillers in the correct position, so that the wrapping on of the wrappers can commence immediately without any further manipulations. In order to prevent the wrappers becoming dry before being used, the endless bands 127 are slightly moistened with water by means of a nozzle 127'.

The endless bands 127 are of course moved intermittently and adhesive is applied to the point of each wrapper. The adhesive-applying mechanism is shown separately to an enlarged scale in Figs. 15 and 16.

The endless band 127 travels over the table 126 and on the said band lies the ready cut wrapper 130. Next to the table 126 is a container 131 for adhesive, in which the adhesive roller 132 dips, relatively to which the stripper 133 of known kind can be adjusted by means of the adjusting screw 134. A flap 135 is hinged to the adhesive container. A spring 136 seeks to keep the flap 135 in the position shown in Fig. 15. In the flap is an opening 137 the shape of which is adapted to the point 138 of the cut wrapper 130.

With the adhesive roller there co-acts an adhesive applying roller 139 which consists of rubber or some other yielding material which will take up the adhesive. The roller 139 is carried by a lever arm 140 which is capable of rocking about the pin 141. The latter is mounted on a push bar 142 at the unsupported end of which is a roller 143. The roller 143 travels on a guide rail 144. The push bar 142 is also provided with a stop 145. A spring 146, one end of which is attached to the lever arm 140 and the other end to the push bar 142, seeks to rock the lever arm to the left in Fig. 15, this movement being checked by the stop 145 against which the lug 147, forming the extension of the rocking lever 140, strikes. The push bar 142 is controlled by the two-armed lever 148 which is pivoted on the pin 149. One end of this two-armed lever is pivotally attached to the push bar 142 at 150, and the other end of the two-armed lever carries a roller 151 which co-acts with the cam disc 152 mounted on the shaft 153, a spring 154 attached to the lever 148 ensuring the continuous engagement between the roller 151 and the cam disc 152.

With the parts in the positions shown in Fig. 15 the adhesive transferring roller 139 is in engagement with the adhesive roller 132. The adhesive is thus transmitted to the roller 139, as the adhesive roller 132 revolves. Subsequently the lever 148 rocks over, moving for instance into the position shown in broken lines in Fig. 15. In this position the roller 143 which acts as a guide for the push bar 142 on the guideway 144 has already been lowered and subsequently the adhesive transmitting roller 139 has also been lowered, having in the meantime moved out of contact with the adhesive roller 132. The lug 147 has now reached the stop 145. The adhesive transmitting roller now presses on the flap 135 so that the latter is pressed down in opposition to the tension of the spring 136 on to the wrapping table 126 or on to the endless band 127 travelling over the same. This takes place when the band is stationary and the wrapper 130 has reached the position shown in Fig. 16, in which the point 138 of the wrapper coincides with the opening 137. On the controlling lever 148 continuing to rock to the right, the roller 139 is passed over the surface of the flap 135, transmitting the adhesive adhering to it through the opening 137 on to the point 138 of the wrapper 130. When this has taken place, the roller moves back again and all the parts return into the position shown in Fig. 15. The band 127 then moves on again, during which motion the wrapper with the adhesive on its point is brought up to the filler W so that the worker can immediately commence wrapping on the wrapper. As soon as the worker has wrapped on the wrapper he inserts the finished cigar into the socket 155. On both sides of the machine a number of such sockets 155 are mounted at regular intervals along endless bands 156. The latter are guided over rollers 157, 158 the axes of which are perpendicular and at right angles to the direction of the arrows shown in Fig. 2.

The cigars inserted point downwards into the suitably shaped sockets remain in the said sockets for some time, so that there will be a moulding action on the point of the cigar and the latter will have sufficient time to receive the desired pointed shape and retain the same. At the end of the path travelled by the cigars in the sockets is a fixed surface 159 (see Figs. 17–21). This surface which has a suitable inclination provides that part of the cigar projecting out of the socket 155 with an abutment along which the cigar slides. Opposite the abutment 159 is an inclined roller 160 the axis of which is at an angle to the longitudinal axis of the cigar. The cigar moving between the roller 160 and the abutment surface 159 is slightly turned and raised, so that the point is eased in the socket 155, this being necessary, as the point provided with adhesive may easily stick in the socket.

After the cigar has been eased in the socket, the part projecting out of the socket 155 passes between two driven rollers 161, 162 which revolve in the direction of the arrows shown in Figs. 19–21. These rollers carry the cigar along by friction and convey it out of the socket on to an endless delivery band 163 which travels over the rollers 164, and 165.

The rollers 161 and 162 between which the cigar is gripped and which deliver it to the endless band 163 are preferably arranged so as to be movable relatively to one another and are so controlled that they are normally further apart than the thickness of a cigar, but that they are moved towards each other until the space between them equals the thickness of a cigar, when a cigar comes between them.

The upper stretch of the delivery band 163, which is so wide that it can support two cigars lying next to one another end on, which are preferably separated from one another by a partition 166, travels over the table 167.

Above this table is a plate 168 at such a distance therefrom that between the table and the plate there is a gap 169 through which the cigars are led. For facilitating the entry of the cigars into this gap, the plate 168 is bevelled upwards at 170 at its forward end. In the gap 169 a kind of counter-rolling takes place, for causing the different kinds of tobacco contained in the finished cigar to lie against one another in a uniform manner.

Finally the two rows of finished cigars are delivered by the endless band 163 to a pair of conveyor drums 171 which are provided around their periphery with chambers 172 for the individual cigar. These drums place the finished cigars on to an endless conveyor band 173. Prior to this, however, the ends of the cigars opposite the points are trimmed off by circular cutters 174 mounted laterally of the drums 171. At this trimming place the cigars are held in their chambers by the guiding surface 175 surrounding the drums. These guiding surfaces also prevent the cigars from prematurely falling out of the chambers of the drums 171.

What I claim is:

1. The method of manufacturing cigars comprising forming a continuous web of tobacco having upper and lower similar rectangular cut leaves of tobacco overlapping each other in the same direction in each layer and an intermediate layer of filler tobacco, comprising such web, cutting a strip from the end of said web an amount equal to a filler for a cigar, forming said strip into the shape of a cigar by rolling and pressing and providing said shaped filler with a wrapper in the usual manner.

2. In an apparatus for making cigars comprising means for conveying cut leaves of tobacco in overlapping relation, means for depositing cut tobacco on said cut leaves, means for evenly distributing said tobacco, means for compressing said cut tobacco and cut leaves, means for depositing a layer of cut leaves arranged similar to the cut leaves first mentioned on top of said cut tobacco, whereby a web of tobacco is formed, means for compressing the web so formed and means for cutting strips from said web while so compressed to form a filler for a cigar.

3. In an apparatus for making cigars as claimed in claim 2 and in combination therewith, of means for rolling and pressing said filler to shape and means for providing said shaped filler with a wrapper.

4. In an apparatus for making cigars comprising means for conveying cut leaves of tobacco in overlapping relation, means for depositing cut tobacco on said cut leaves, means for evenly distributing said tobacco, means for compressing said cut tobacco and cut leaves, means for depositing a layer of cut leaves arranged similar to the cut leaves first mentioned on top of said cut tobacco, whereby a web of tobacco is formed, means for compressing the web so formed, means for cutting strips from said web while so compressed to form a filler for a cigar, means for shaping said filler and means for providing said shaped filler with a wrapper.

5. Apparatus for manufacturing cigars, comprising in combination a conveyor, means co-operating with said conveyor for delivering a layer of cut tobacco leaves to the conveyor, means for delivering a layer of filling tobacco to said conveyor arranged so as to deposit the filling tobacco on the layer of cut tobacco leaves, means for delivering a second layer of cut tobacco leaves to said conveyor arranged so as to deposit said second layer on the layer of filling tobacco, severing means interposed in the path of the tobacco on the conveyor for separating from said tobacco strips containing the required quantity to form a filler, a rolling device adapted to shape said strips into filler, means arranged in proximity to said severing means for receiving the strips and transferring them to said rolling device, a wrapping table, a mould adapted to receive the fillers from said rolling device, means connected to said mould for conveying said mould from a position in proximity to the rolling device to a position in proximity to said wrapping table, and a conveyor for conveying wrappers to said wrapping table, as and for the purposes set forth.

6. Apparatus for manufacturing cigars, comprising in combination a conveyor, means co-operating with said conveyor for delivering a layer of cut tobacco leaves to the conveyor, means for delivering a layer of filling tobacco to said conveyor arranged so as to deposit the filling tobacco on the layer of cut tobacco leaves, means for delivering a second layer of cut tobacco leaves to said conveyor arranged so as to deposit said second layer on the layer of filling tobacco, severing means interposed in the path of the tobacco on the conveyor for separating from said tobacco strips containing the required quantity to form a filler, two rolling devices, means arranged in proximity to said severing means for receiving the strips and adapted to transfer said strips alternately to each of said rolling devices, two wrapping tables, a conveyor device having two groups of moulds adapted to receive the fillers from the respective rolling devices, said conveyor device being arranged so as to move said moulds from a position in proximity to the rolling devices to a position in proximity to said wrapping tables and conveyors for conveying wrappers to said wrapping tables, as and for the purposes set forth.

7. Apparatus for manufacturing cigars as set forth in claim 5, in which the means for receiving the severed strips and transferring them to the rolling device comprise moulds adapted to subject the severed strips to a preliminary moulding operation and a conveying device interposed between the said moulds and the rolling device for transferring the preliminarily moulded fillers to the rolling device.

8. Apparatus for manufacturing cigars as set forth in claim 6, in which the means for receiving the severed strips and transferring them to the rolling devices comprise moulds adapted to subject the severed strips to a preliminary moulding operation, a conveying device interposed between said moulds and each of said rolling devices for transferring the preliminarily moulded fillers to said rolling devices and a reversing device arranged between said moulds and said conveying devices for guiding the preliminarily moulded filler alternately on to each of said conveying devices.

9. Apparatus for manufacturing cigars as set forth in claim 6, having guiding means interposed between the moulds and the wrapping tables for guiding the moulded fillers to said tables, said guiding means being adapted to deposit the fillers in an inclined position on the tables, as and for the purposes set forth.

10. Apparatus for manufacturing cigars, comprising in combination a main band conveyor, an endless band feed conveyor adapted to receive a layer of cut tobacco leaves, an endless band transfer conveyor having its one end in operative engagement with the delivery end of said feed conveyor and its other end in operative engagement with said main band conveyor so as to remove the cut tobacco leaves from said feed conveyor and transfer them to said main band conveyor, means for delivering a layer of filling tobacco to said main band conveyor arranged so as to deposit the filling tobacco on the layer of cut tobacco leaves, a second endless band feed conveyor arranged above the main band conveyor in a position with respect to said first feed conveyor so as to enable a single worker to supply both feed conveyors with cut tobacco leaves, an auxiliary conveyor in operative engagement with the delivery end of said second feed conveyor and adapted to deposit the cut tobacco leaves in a layer on said layer of filling tobacco, severing means interposed in the path of the tobacco on the main band conveyor for separating from said tobacco strips containing the required quantity to form a filler, said second feed conveyor having its lower side in proximity to the main band conveyor so as to feed the tobacco thereon to said severing means, a rolling device adapted to shape said strips into fillers, means arranged in proximity to said severing means for receiving the strips and transferring them to said rolling device, a wrapping table, a mould adapted to receive the fillers from said rolling device, means connected to said mould for conveying said mould from a position in proximity to the rolling device to a position in proximity to said wrapping table, and a conveyor for conveying wrappers to said wrapping table, as and for the purposes set forth.

11. Apparatus for manufacturing cigars as set forth in claim 5, in which the means for receiving the severed strips and transferring them to the rolling device comprise a rotatable drum having a plurality of mould troughs mounted on its periphery, said troughs having covers adapted to be opened to enable the strips from the severing device to enter and leave the troughs and to be closed so as to subject the severed strips in the troughs to a preliminary moulding operation for imparting an approximately circular cross-section to the strips.

12. Apparatus for manufacturing cigars as set forth in claim 5, in which the means for receiving the severed strips and transferring them to the rolling device comprise a rotatable drum having a plurality of mould troughs mounted on its periphery, said troughs having covers adapted to be opened to enable the strips from the severing device to enter and leave the troughs and to be closed so as to subject the severed strips in the troughs to a preliminary moulding operation for imparting an approximately circular cross-section to the strips, and the means for transferring the preliminarily moulded strips to the rolling device comprise a carrier having a conveying trough adapted to receive said strips and displaceable from a position with the conveying trough in proximity to the rotatable drum to a position in proximity to the rolling device, said conveying trough having a movable portion capable of releasing the strips, and actuating means operatively connected to said carried and to said movable portion for moving the carrier from the one position to the other and for moving the movable portion to release the strips when the conveying trough is in proximity to the rolling device.

13. Apparatus for manufacturing cigars as set forth in claim 5, in which the means for receiving the severed strips and transferring them to the rolling device comprise a rotatable drum having a plurality of mould troughs mounted on its periphery, said troughs having covers adapted to be opened to enable the strips from the severing device to enter and leave the troughs and to be closed so as to subject the severed strips in the trough to a preliminary moulding operation for imparting an approximately circular cross section to the strips, the rolling device comprises a rolling cloth and the means for transferring the preliminarily moulded strips to the rolling device comprise a two-armed lever having a conveying trough of triangular cross-section adapted to receive said strips at one end and a longitudinal slot at the other end, said trough comprising a fixed part and a pivoted part, a spring in engagement with said fixed and pivoted parts for holding said parts together, said triangular conveying trough having its vertex pointing downwards, actuating means comprising a crank in engagement with the longitudinal slot in the two-armed lever for moving said two-armed lever from a position with the conveying trough in proximity to the rotatable drum to a position with the trough in proximity to the rolling device with its vertex engaging and depressing the rolling cloth so as to form a loop in said cloth and actuating means operatively connected to the pivoted part of the conveying trough so as to move said part away from the fixed part when the vertex of said trough is in engagement with the band of the rolling device, as and for the purpose set forth.

14. Apparatus for manufacturing cigars, as set forth in claim 6, in which the means for receiving the severed strips and transferring them to the rolling devices comprise moulds adapted to subject the severed strips to a preliminary moulding operation, a conveying device interposed between said moulds and each of said rolling devices for transferring the preliminary moulded fillers to the rolling devices, a member having a pocket adapted to receive a filler from said moulds, said member being displaceable horizontally from a position in proximity to said moulds and one of said conveying devices to a position in proximity to the other conveying device, said member having a movable bottom for said pocket and actuating means connected to said member for moving it from the one position to the other, and means adapted to engage the movable bottom for displacing it to release the filler and allow the filler to pass to said other conveying device, as and for the purposes set forth.

15. Apparatus for manufacturing cigars, as set forth in claim 6, in which the means for receiving the severed strips and transferring them to the rolling devices comprise moulds adapted to subject the severed strips to a preliminary moulding operation, a conveying device interposed between said moulds and each of said rolling devices for transferring the preliminarily moulded fillers to the rolling devices, a vertical rock shaft, a charging member having an opening adapted to receive a filler from said moulds on said rock shaft, said member being displaceable horizontally from a position in proximity to said moulds and one of said conveying devices to a position in proximity to the other conveying device, a bottom member capable of turning on said vertical shaft, a spring connected to said bottom member and charging member for holding the former in a position on the latter to close the bottom of said opening, actuating means connected to said charging member for moving it from the one position to the other and a stop interposed in the path of said bottom member for displacing it to uncover the bottom of the opening in the charging member when over the said other conveying device, as and for the purposes set forth.

16. Apparatus for manufacturing cigars as set forth in claim 5, in which the rolling device comprises a stationary rolling table, a rolling cloth fixed at one end to one end of said rolling table, a fixed frame member having the other end of the rolling cloth fixed to it, movable guiding means comprising a roller passed under the rolling cloth for maintaining the rolling cloth taut, actuating means connected to said guiding means for moving the roller from a position in which the rolling cloth is taut to a position in which the cloth is slack, so as to enable a loop to be formed in the cloth to receive a filler, the means for transferring the fillers to the rolling device comprising a conveying device adapted to place the fillers on the rolling cloth beyond the end of the rolling table remote from the place of attachment of the cloth thereto, and in which a rolling roller is passed under the rolling cloth, said rolling roller having guiding means for guiding it along over the rolling table and actuating means connected to it for passing it over said table to roll the filler, said actuating means being adapted to move the rolling roller past the point of attachment of the cloth with the rolling table so as to draw the cloth taut and eject the rolled filler.

17. Apparatus for manufacturing cigars, as set forth in claim 5, in which the rolling device comprises a stationary rolling table, a rolling cloth fixed at one end to one end of said rolling table, a fixed frame member having the other end of the rolling cloth fixed to it, a lever arm having a tensioning roller in engagement with the rolling cloth for maintaining the rolling cloth taut, actuating means connected to said lever for moving the lever from a position with the tensioning roller holding the roller cloth taut to a position with the tensioning roller holding the rolling cloth slack so as to enable a loop to be formed in the cloth to receive a filler, the means for transferring the fillers to the rolling device comprising a conveying device adapted to place the fillers on the rolling cloth beyond the end of the rolling table remote from the place of attachment of the cloth thereto, a second lever having a straight guide, a rolling roller passed under the rolling cloth and slidable in said straight guide, actuating means connected to said second lever for rocking the lever from a position with a portion of the straight guide remote from the place of attachment of the rolling cloth to the rolling table below the level of said table to a position with said portion above said table, a crank, and a connecting rod mechanism having the connecting rod in operative engagement with said rolling roller and adapted to slide said roller along over the rolling table to roll the filler, as and for the purposes set forth.

18. Apparatus for manufacturing cigars, as set forth in claim 5, in which the mould for receiving the fillers from the rolling device comprises a pair of gripping members forming the middle part of the mould, actuating means connected to said gripping members for moving the latter together to embrace the middle part of the filler, a cap on each side of said gripping members adapted to receive the respective ends of the filler and means operatively connected to said caps for sliding the latter on to the ends of the filler, and in which the conveying means connected to said mould comprise an endless chain guided so as to extend from the rolling device to the wrapping table along an extended path having a length such that the filler has sufficient time to assume the shape of the mould.

19. Apparatus for manufacturing cigars, comprising in combination a conveyor, means co-operating with said conveyor for delivering a layer of cut tobacco leaves to the conveyor, means for delivering a layer of filling tobacco to said conveyor arranged so as to deposit the filling tobacco on the layer of cut tobacco leaves, means for delivering a second layer of cut tobacco leaves to said conveyor arranged so as to deposit said second layer of filling tobacco, severing means interposed in the path of the tobacco on the conveyor for separating from said tobacco strips containing the required quantity to form a filler, a rolling device adapted to shape said strips into fillers, means arranged in proximity to said severing means for receiving the strips and transferring them to said rolling device, a wrapping table, a cross bar, a filler mould comprising a pair of gripping members adapted to embrace the middle part of the fillers, said gripping members being mounted on the middle of said cross bar, actuating means connected to said gripping members for moving the latter together to grip the filler, caps slidable on the cross bar, one on each side of said gripping members, adapted to receive the respective ends of the fillers, springs connected to said caps and to the cross bar for moving the caps towards the middle of the bar to engage the ends of the filler, two parallel endless chains connected to said cross bar and guided so as to extend from the rolling device to the wrapping table along an extended path, for conveying the filler mould from a position in proximity to the rolling device to a position in proximity to said wrapping table, fixed guiding rails arranged in proximity to the rolling device and wrapping table between the chains and adapted to engage the said caps to push the same outwardly against the force of the springs, means arranged in proximity to said rolling device and wrapping table for opening the grippers, and a conveyor for conveying wrappers to said wrapping table, as and for the purposes set forth.

20. Apparatus for manufacturing cigars as set forth in claim 19, in which the gripping members are hinged together and the actuating means for said gripping members comprise a pair of scissor arms, one connected to each gripping member, a pivot pin passed through said scissor arms for connecting said arms together, guiding means on the cross bar for said pivot pin for guiding the pin so as to enable it to slide in the direction of the joint of the filler mould, rollers on the ends of said pivot pin and fixed guiding walls for said rollers extending beside the endless chains for conveying the mould and having offset portions for displacing the pivot pin to open and close the gripping members.

21. Apparatus for manufacturing cigars as set forth in claim 19, in which the gripping members are bevelled conically at each end and the slidable caps are countersunk at the ends adjacent said grippers, the countersunk portions of the caps being adapted to fit the bevelled ends of the grippers when the grippers and caps are moved together to close the mould, so as mutually to centre one another and form a filler without a fin.

22. Apparatus for manufacturing cigars as set forth in claim 19, having guideways in proximity to the wrapping table and arranged in the path of the filler mould for conveying the moulded filler from the filler mould to the wrapping table.

23. An apparatus for manufacturing cigars as set forth in claim 5, in which the conveyor for supplying wrappers to the wrapping table comprises an endless band and having a plate arranged above said endless band and movable from a position out of contact with said band to a position in proximity to the band and resting on a wrapper, an opening in said plate adapted to expose the pointed part of the wrapper, adhesive applying means adapted to be passed over the plate for applying adhesive to said pointed part of the wrapper through the opening in the plate and means connected to the plate for moving it out of contact with the wrapper, as and for the purposes set forth.

24. An apparatus for manufacturing cigars as set forth in claim 5, in which the conveyor for supplying wrappers to the wrapping table comprises a plurality of endless bands and having spraying means including a nozzle for spraying water onto said endless bands for keeping said bands continually moist.

25. An apparatus for manufacturing cigars as set forth in claim 5, in which the conveyor for supplying wrappers to the wrapping table comprises an endless band and having an adhesive container, a plate hinged to said adhesive container above said endless band movable from a position out of contact with said band to a position in proximity to the band and resting on a wrapper, an opening in said plate adapted to expose the pointed part of the wrapper, an adhesive collecting roller dipping in said adhesive container, an adhesive applying roller of yielding material capable of absorbing adhesive, supporting and actuating means connected to said adhesive applying roller for moving the roller from a position in contact with the adhesive collecting roller and displacing it over the plate for applying adhesive to the pointed part of the wrapper through the opening in the plate and a spring connected to said plate for raising it from the wrapper, as and for the purposes set forth.

26. Apparatus for manufacturing cigars as set forth in claim 5, having means for giving the cigar head its final pointed shape, comprising an endless conveyor, sockets on said conveyor adapted to receive the cigars from the wrapping table and to carry the said cigars with a portion thereof projecting outwardly from the sockets, ejecting means arranged in proximity to the conveyor in the path of the sockets, adapted to engage the projecting portions of the cigars and to remove them from the sockets, and a delivery device for receiving the cigars, said ejecting means being adapted to feed the cigars to said delivery device.

27. Apparatus for manufacturing cigars as set forth in claim 5, having means for giving the cigar head its final pointed shape, comprising an endless conveyor, sockets on said conveyor adapted to receive the cigars from the wrapping table and to carry the said cigars with a portion thereof projecting outwardly from the sockets, a ramp arranged so as to extend in the path of the projecting portions of the cigars so as to enable said projecting portions to move along in contact with said ramp, a roller spaced from said ramp so as to lie on the side of the projecting portions of the cigars remote from said ramp with its axis inclined to the direction of the longitudinal axes of the cigars and adapted to engage the cigars so as to rotate them during the passage thereof between said ramp and roller, for preventing the point of the cigars from adhering to the sockets, ejecting means arranged in proximity to the conveyor in the path of the sockets, adapted to engage the projecting portions of the cigars and to remove them from the sockets, and a delivery device for receiving the cigars, said ejecting means being adapted to feed the cigars to said delivery device.

28. Apparatus for manufacturing cigars as set forth in claim 5, having means for giving the cigar head its final pointed shape, comprising an endless conveyor, sockets on said conveyor adapted to receive the cigars from the wrapping table and to carry the said cigars with a portion thereof projecting outwardly from the sockets, ejecting means comprising a pair of rollers spaced from one another in proximity to the conveyor and positioned so as to lie one on each side of the cigars with their axes parallel to one another and at right angles to the direction of the longitudinal axes of the cigars, said rollers being adapted to engage the projecting portions of the cigars when the latter come between them and being rotatable in opposite directions so as to remove the cigars from the sockets, and a delivery device for receiving the cigars, said ejecting means being adapted to feed the cigars to said delivery device.

29. Apparatus for manufacturing cigars as set forth in claim 5, having means for giving the cigar head its final pointed shape, comprising an endless conveyor, sockets on said conveyor adapted to receive the cigars from the wrapping table and to carry the said cigars with a portion thereof projecting outwardly from the sockets, ejecting means comprising a pair of rollers positioned in proximity to the conveyor so as to lie one on each side of the cigars and displaceable with respect to one another, with their axes parallel to one another and at right angles to the direction of the longitudinal axes of the cigars, said rollers being adapted to engage the projecting portions of the cigars when the latter come between them and being rotatable in opposite directions so as to remove the cigars from the sockets, and a delivery device for receiving the cigars, said ejecting means being adapted to feed the cigars to said delivery device.

30. Apparatus for manufacturing cigars as set forth in claim 5, having means for giving the cigar head its final pointed shape, comprising an endless conveyor, sockets on said conveyor adapted to receive the cigars from the wrapping table and to carry the said cigars with a portion thereof projecting outwardly from the sockets, ejecting means arranged in proximity to the conveyor in the path of the sockets, adapted to engage the projecting portions of the cigars and to remove them from the sockets, a conveyor band for receiving the cigars, said ejecting means being adapted to feed the cigars to said conveyor band and a plate arranged above said conveyor band, parallel to and spaced from the upper stretch of the band, so as to enable the cigars to travel between the band and the plate in frictional contact therewith, as and for the purposes set forth.

31. Apparatus for manufacturing cigars as set forth in claim 5, having means for giving the cigar head its final pointed shape, comprising an endless conveyor, sockets on said conveyor adapted to receive the cigars from the wrapping tables and to carry the said cigars with a portion thereof projecting outwardly from the sockets, ejecting means arranged in proximity to the conveyor in the path of the sockets, adapted to engage the projecting portions of the cigars and to remove them from the sockets, a conveyor band for receiving the cigars, said ejecting means being adapted to feed the cigars to said conveyor band, a plate arranged above said conveyor band, parallel to and spaced from the upper stretch of the band, so as to enable the cigars to travel between the band and the plate in frictional contact therewith, for rolling the cigars, and means for trimming the ends of the cigars remote from the points, comprising a rotatable drum having a plurality of chambers on its periphery adapted to receive the rolled cigars from the conveyor band, said drum having a width which is less than the length of a cigar and positioned with respect to the conveyor band so that the cigars pass into the chambers with the ends remote from the points projecting from one side of the drum, a circular cutter arranged in proximity to said side in a position so as to sever the projecting end of the cigar during the rotation of the drum and a retaining guard for the cigars surrounding a portion of the drum on each side of said cutter, as and for the purposes set forth.

32. A method of manufacturing cigars, consisting in forming a layer of tobacco leaves cut to shape, placing on said layer of tobacco leaves a layer of filling tobacco, placing a layer of tobacco leaves cut to shape on said layer of filling tobacco, so as to form a continuous band of filling tobacco between a lower support layer of cut tobacco leaves and an upper cover layer of cut tobacco leaves, subdividing said band transversely into strips each containing the requisite quantity of tobacco for forming a cigar filler, rolling said strips to form fillers, moulding said fillers, delivering said moulded fillers to a wrapping table and applying wrappers to the moulded fillers.

33. In a method of manufacturing cigars, in which the layers of tobacco leaves forming the support and cover layers of the band of filling tobacco comprise a plurality of overlapped cut tobacco leaves the step of arranging the cut tobacco leaves so that the edges thereof which are directed towards the end of the band at which the latter is subdivided are covered by the preceding cut tobacco leaves.

In testimony whereof I have signed my name to this specification.

RICHARD CARL JULIUS ADOLF OHMSEN.